Aug. 12, 1952     F. L. LEFEBVRE     2,606,574
REINFORCED HIGH-TEMPERATURE GLASS CONDUIT
Filed Aug. 5, 1948
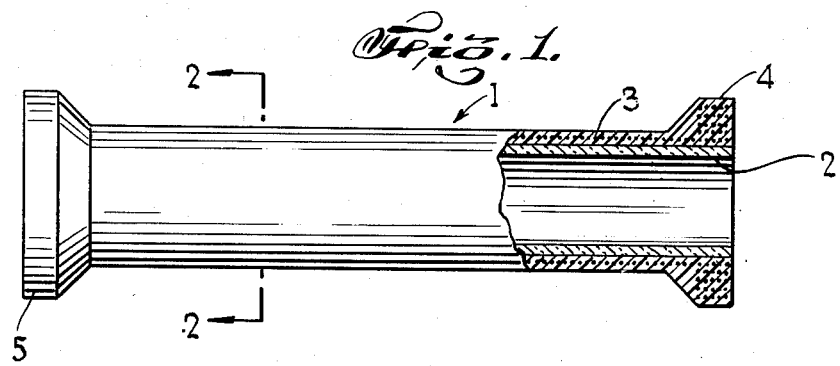
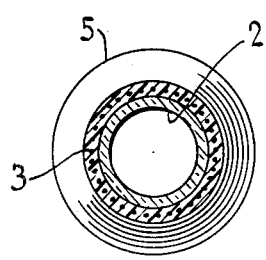
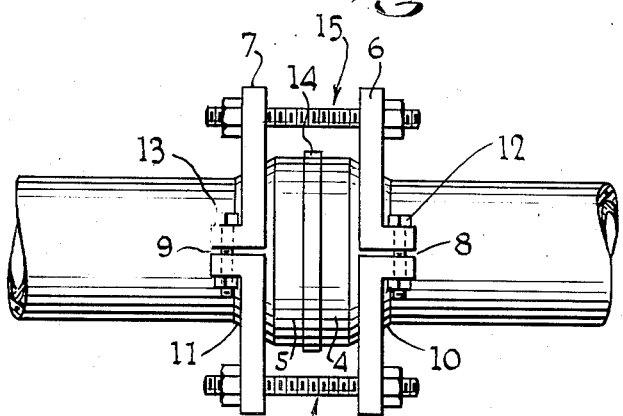
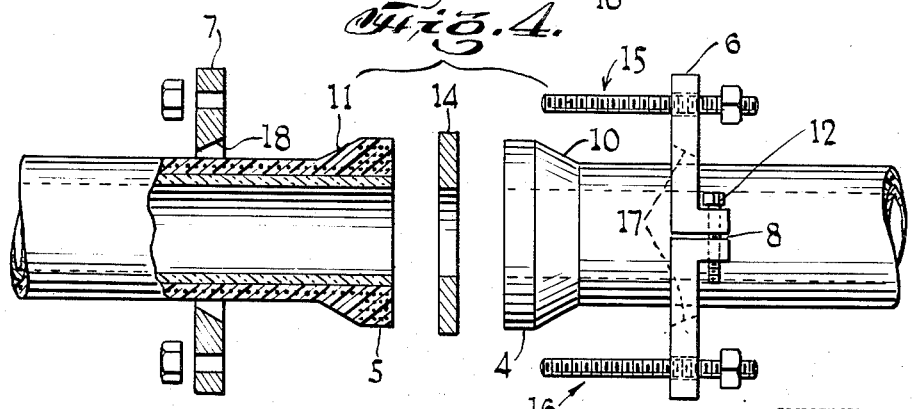
INVENTOR.
FRED L. LEFEBVRE
BY
ATTORNEY Patented Aug. 12, 1952

2,606,574

UNITED STATES PATENT OFFICE 2,606,574

REINFORCED HIGH-TEMPERATURE GLASS CONDUIT

Fred L. Lefebvre, Elizabeth, N. J., assignor to Amersil Company, Inc., Hillside, N. J., a corporation of New York Application August 5, 1948, Serial No. 42,553

3 Claims. (Cl. 138—76)

The present invention deals with reinforced high temperature glass and more particularly with high temperature glass resistant to mechanical shock.

High temperature glasses, such as fused quartz and fused silica, are widely used, e. g. in the chemical industries, due to their resistance to high temperatures and chemical attack or because of other desirable properties, such as weight, etc., and because they may be substituted for other less available materials. The use of such glass has, however, been limited as a result of its fragility. While a high temperature glass is advantageous in view of its chemical resistant qualities, there are instances where it cannot adequately replace other materials, e. g. metals, for special purposes, for instance piping or pipe sections which may be subjected to mechanical shock.

Heretofore, the fragility of chemical resistant glasses has been partly compensated for by heat treatment or by the application, in combination therewith, of metal housings, etc. However, heat treatment has the disadvantage that it does not provide shatter proof protection and metal housings are disadvantageous in that they do not adequately protect the glass from mechanical shock.

Referring specifically to pipe sections, glasses are further disadvantageous in that the joining of glass pipe sections to form continuous lengths requires special application of appropriate joining means, e. g. metal flanges, which, in regard to the difference in the coefficients of expansion between the glass and metal, subject the glass piping to stresses and strains likely to cause breakage.

It is one object of this invention to provide equipment or other articles of high temperature glass which shall be resistant to mechanical shock. It is another object of this invention to provide equipment or other articles of high temperature glass in a form whereby such glass may be advantageously joined together to form continuous lengths, e. g. continuous piping. Other objects and advantages of this invention will become apparent from the following description and accompanying drawings forming part hereof, in which:

Figure 1 illustrates an elevational view, partly in longitudinal section, of reinforced glass piping according to the invention, Figure 2 illustrates a cross-sectional view of Figure 1 along the lines 2—2, Figure 3 illustrates an elevational view of a pipe joint, and Figure 4 illustrates an exploded view of Figure 3, partly in section, showing the assembly thereof.

The invention comprises forming equipment or other articles of high temperature glass, preferably fused quartz and fused silica, and providing such equipment and articles with an outer layer of reinforcing and protecting plastic material, which in accordance with the invention, consists either of laminated plastics or plastic material having incorporated therewith a strengthening agent, e. g. shredded asbestos or the like material, said plastic layer having a thickness greater than that of the glass.

According to Figure 1, the pipe section 1 comprises an inner liner 2 of high temperature glass such as fused quartz, or fused silica, which is provided with a protective coating 3 of laminated plastics and flanges 4 and 5 of laminated plastics.

In applying the plastic reinforcing and protecting layer, I first provide a plastic material, e. g. base resin plastic, in a state of suitable viscosity for application onto the outer surface of the fused quartz or fused silica pipe section and subsequently apply the plastic and a strip or sheet material, for example a strip or sheet material of fibrous structure which may be in the form of a cloth, e. g. fiber glass cloth, in an alternative manner until a desirable thickness of laminated plastics is provided on the fused quartz or fused silica pipe section. Substantially at the ends of such pipe section, I apply a thickness of laminated plastics greater than that which covers the major portion of the pipe section in order to provide the plastic flanges as illustrated.

Other than alternatively applying a plastic and, for example, fiberglass cloth on a fused quartz or fused silica pipe section, I may provide either a strip or sheet of fibrous material which comprises a suitable base for the impregnation of a plastic therewith, or for the deposition of a plastic thereon, so as to form a strip or sheet material having thereon a layer of plastic material in a state of suitable viscosity, and then in a single operation wind or otherwise apply such prepared material onto the glass pipe section until a suitable thickness of laminated plastics is provided.

On the other hand, I may first provide a plastic material of suitable viscosity for application and which has incorporated therewith a filler or strengthening agent, such as shredded asbestos or the like material, and apply such composition onto the fused silica or fused quartz pipe section until a suitable thickness of plastics is provided, with, of course, an added thickness of such plastic material to form plastic flanges.

Having formed a composite material, e. g. a preformed fused quartz tube with laminated plastics thereon according to the operations above described, the laminated plastics structure is allowed to polymerize and the shrinkage thereof provides a securely bonded composite material, e. g. a plastic coated glass tube as particularly illustrated by section 2—2 of Figure 1 shown as Figure 2.

After the plastic material has sufficiently polymerized and the composite material has been formed, the equipment, e. g. piping or other articles thus provided, may be further formed to desired dimensions by machining or otherwise finishing the plastic to provide, for example, the proper joining means such as flanges in the case of piping, and a thick film of plastic material may be subsequently applied thereto to provide a smooth surface.

The plastics according to the invention comprise base resin plastics either as a single organic base resin plastic or as a combination of plastics such that when polymerized one layer may have a greater hardness than another, e. g. the inner layer of plastic material may have a greater resiliency when polymerized than another so that a mechanical shock transmitted through the harder outer layer will be cushioned by said inner layer before reaching the preformed high temperature glass tube.

By the use of plastics according to the invention in combination with the high temperature glass herein referred to, it is possible to join together sections of equipment, e. g. piping, etc., to form complete equipment which would be difficult to form by the use of, for example, fused quartz alone or together with metal, since the differences of the coefficients of expansion between the glass and metal subject the equipment to stresses and strains likely to cause breakage.

The term "plastic" as used herein signifies any of the well-known resins or plastic compounds which are available on the market, such as the phenol formaldehyde resins, the furfural alcohol polymeric substances, cellulose acetate synthetic resins, and the like.

Figure 3 illustrates a pipe joint in combination with plastic reinforced high temperature glass showing in particular a construction which allows a sturdy connection which is maintained secure regardless of the expansion or contraction of the glass tubing. The metal flanges 6 and 7 are split at 8 and 9 and are adjustably positioned with respect to the conic portions 10 and 11 which are tapered rearwardly of the ends of the pipe section, and secured thereto in proper position by the locking bolts 12 and 13. A suitable gasket 14 is positioned between the plastic flanges 4 and 5 and the joint is clamped by means of the clamping bolts 15 and 16.

Figure 4 illustrates an exploded view of Figure 3, partly in section, showing particularly the relation between the conic portions 10 and 11 and the beveled complementary inner rings 17 and 18 which, upon pressure provided by the clamping bolts, force the plastic flanges of both pipe sections against the gasket 14 thereby securing the pipe joint.

The reinforced high temperature glass according to the invention in combination with the pipe joint as illustrated provides glass piping resistant to mechanical shock, and, because of the inherent resiliency of the plastics, even though the plastics have a higher coefficient of expansion than, for example, fused quartz, the individual increments of expansion of the plastics over the fused quartz will be balanced out by the above-mentioned resiliency without so stressing the quartz as to cause it to shatter.

By the use of, for example, laminated plastics according to the invention in combination with the high temperature glass herein referred to, it is possible to provide tanks with high temperature glass tiles reinforced by said laminated plastics, or pieces of equipment that can be joined together to form complete equipment which would otherwise be most difficult to manufacture into an integral form by the use of fused quartz alone.

What I claim is:

1. A reinforced fused quartz pipe section adapted for resistance to mechanical shock, comprising in combination fused quartz tubing having an outer coating of laminated plastics, said laminated plastics coating including a plurality of layers of plastics, the innermost layer being formed of a plastic having more resiliency than the plastic forming the outer layer, said laminated plastics coating including fiber glass cloth and being of greater thickness than the fused quartz tubing, and laminated plastic flanges providing substantially at the ends of said pipe section and upon said coating.

2. A reinforced conduit adapted for resistance to mechanical shock comprising a pipe formed of high temperature glass, a coat of laminated plastic covering and being bonded to the outside surface of said pipe, the innermost layer of said laminated plastic coat being formed of plastic having more resiliency than the plastic in another layer.

3. A reinforced conduit adapted for resistance to mechanical shock comprising high temperature glass pipe, a coat of laminated plastic covering and being bonded to the outside surface of said pipe, the innermost layer of said laminated plastic coat being formed of plastic having more resiliency than the plastic in an outer layer, and a laminated plastic flange on said coat and located at one end of said pipe.

FRED L. LEFEBVRE.

REFERENCES CITED

The following references are of record in the file of this patent:

UNITED STATES PATENTS

| Number | Name | Date |
| --- | --- | --- |
| 674,928 | Mauran | May 28, 1901 |
| 1,939,872 | Bedur | Dec. 19, 1933 |
| 2,176,837 | Ellis | Oct. 17, 1939 |
| 2,313,889 | Porter | Mar. 16, 1943 |
| 2,366,514 | Gaylor | Jan. 2, 1945 |
| 2,377,317 | Blume | June 5, 1945 |
| 2,408,960 | Stivason | Oct. 8, 1946 |